Patented May 15, 1951

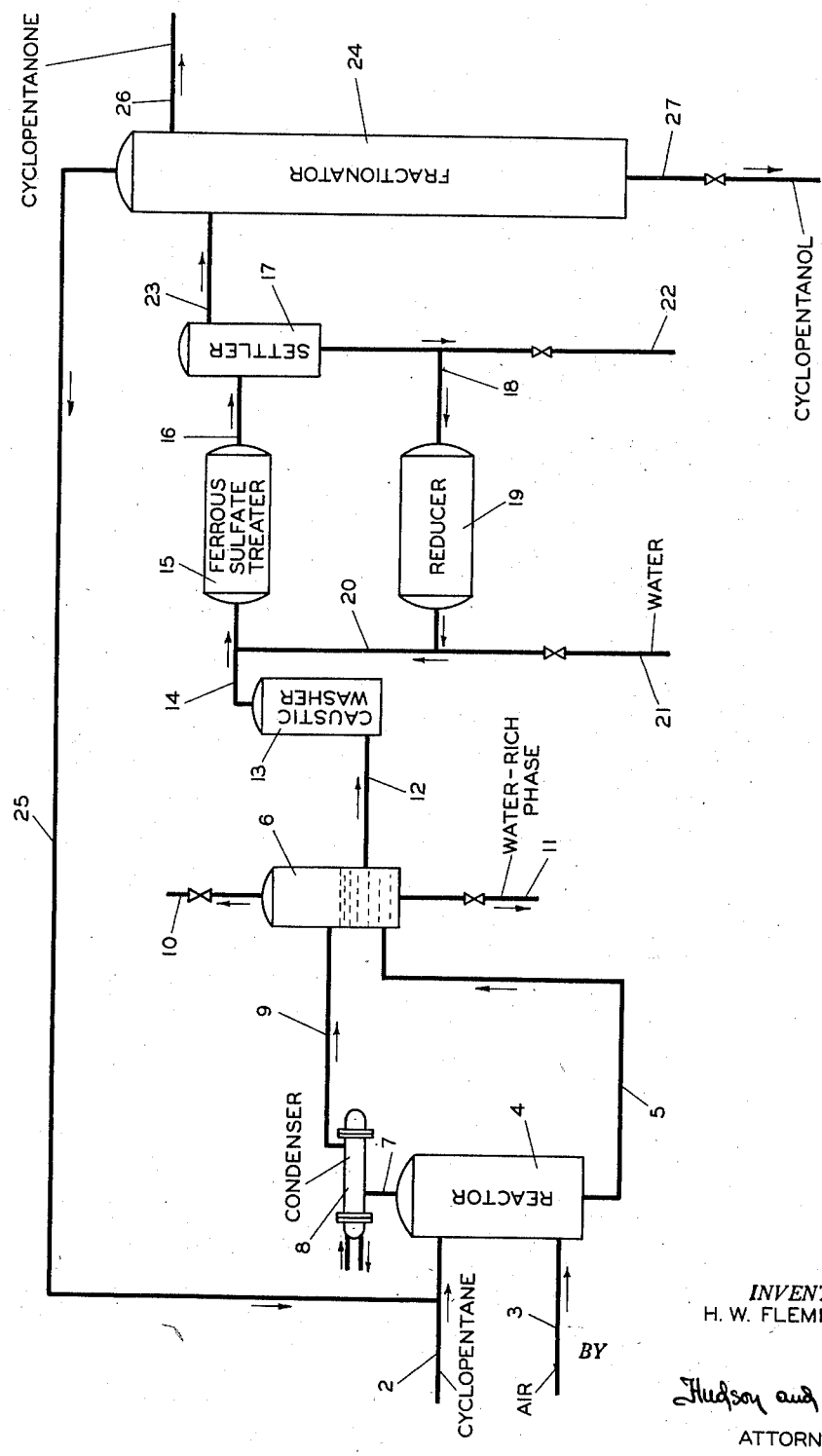

2,552,670

UNITED STATES PATENT OFFICE 2,552,670

PURIFICATION OF CYCLIC KETONES OBTAINED BY OXIDATION OF HYDROCARBONS

Harold William Fleming, Bartlesville, Okla., assignor to Phillips Petroleum Company, a corporation of Delaware Application July 30, 1946, Serial No. 687,195

6 Claims. (Cl. 260—586)

This invention relates to the oxidation of cyclic hydrocarbons, and more particularly to the production of cyclic ketones by the oxidation of cycloparaffins. In a specific aspect it relates to the removal of highly oxygenated organic compounds produced during the oxidation and to increasing the yield of cyclic ketones.

The production of cyclic ketones by the oxidation of cycloparaffins with air or with oxygen is known to the art. It is also known that, particularly when such an oxidation process is conducted continuously, the effluent from the oxidation zone contains, in addition to the desired oxidation product, highly active oxygenated compounds which appear to be organic peroxides. These highly oxygenated compounds are undesirable because, under the influence of heat, as for example, during fractionation of the oxidation effluent, at temperature of 100° C. they decompose, often violently. The decomposition is accompanied by an exceedingly rapid evolution of heat, which makes temperature control difficult, and by some loss of the desired product. Since these highly active oxygenated compounds seem to be organic peroxides, they will be referred to as peroxides in this disclosure.

According to the prior art, these peroxides or the like have been removed by heating the oxidation effluent at carefully controlled temperature at which the peroxides decompose non-violently. Since gas is liberated during the decomposition, pressure must also be carefully controlled. Such methods are undesirable because they tend to decrease product yield and to promote side reactions. Furthermore, they are not effective to remove peroxides completely without causing desired products to react further.

It is an object of the present invention to provide an effective method for removal of highly oxygenated products, such as organic peroxides, from reaction effluents obtained by oxidation of cycloparaffins. It is a further object of the present invention to provide a process for removing peroxides from the products of oxidation of cycloparaffins to form cyclic ketones and at the same time to increase the yield of cyclic ketones.

In accordance with the present invention, the peroxides are removed from the oxidation effluent by treatment with an aqueous solution of a reducing agent, such as a ferrous salt, a stannous salt, a chromous salt, a sulfite, or a bisulfite, that reduces peroxides. Treatment with aqueous ferrous sulfate produces, in addition, the effect, heretofore unexpected, of substantially increasing the yield of cyclic ketones. Although conditions for the ferrous sulfate treatment may vary greatly, treatment at about 0 to 30° C. and atmospheric pressure is satisfactory. The concentration of the aqueous reducing agent may range from the minimum necessary to react with all the peroxides, to that necessary for a saturated aqueous solution. When a solution of a metal salt is used, it is preferable that the solution contain sufficient acid, preferably sulfuric, to prevent hydrolysis. Sufficient acid is present when the solution has a pH below about 3. In general, a pH of about 1 to 2.5 is preferred.

The invention may be described in greater detail with reference to the accompanying drawing, which is a schematic flow diagram of one arrangement of apparatus suitable for practicing the invention.

Cyclopentane and air enter reactor 4 through inlets 2 and 3, respectively. Reactor 4 is preferably so constructed that the influent air is divided into small bubbles, as by the use of a perforated distributor, which contact the cycloparaffin, cyclopentane for example. Oxidation catalysts such as lead and mangenese acetates may be present if desired. Reaction conditions are, approximately: temperature, 100 to 200° C.; pressure, 100 to 500 p. s. i.; residence time, 30 to 100 minutes; volumes of air per volume of liquid cyclopentane, 50 to 200. The gaseous effluent passes through conduit 7 to partial condenser 8, in which normally liquid material is liquefied and from which the liquefied material is passed to settler 6 through conduit 9. Normally gaseous material is withdrawn from the system through outlet 10. The liquid effluent from reactor 4 is passed through conduit 5 to settler 6, in which it separates into a heavier or aqueous phase and a lighter or organic phase. The aqueous phase, which contains, in addition to water, water-soluble oxygenated organic compounds, is withdrawn through outlet 11, and may be treated, by means not shown, to convert the water-soluble organic compounds to organic acids. The organic phase is passed through conduit 12 to caustic washer 13, in which dissolved acids are removed by washing with aqueous alkali. The washed organic phase is passed through conduit 14 to treater 15, in which it is intimately contacted with aqueous ferrous sulfate, or other suitable aqueous reducing agent, which enters through conduits 20 and 14. Since the peroxide-ferrous sulfate reaction is exothermic, it is desirable that treater 15 be provided with suitable cooling means, not shown in the drawing, in order to maintain the temperature in the desired range. The effluent from treater 15 is passed through conduit 16 to settler 17, in which it separates into a heavier or aqueous phase and a lighter or organic phase. The aqueous phase is passed to reducer 19 in which it is contacted with finely divided metal, such as iron shavings or turnings, to reduce ferric to ferrous sulfate. The regenerated ferrous sulfate solution is recycled through conduits 20 and 14. On account of the reduction reaction in reducer 19, the concentration of the ferrous sulfate solution gradually increases; therefore water is continuously added to the solution through inlet 21. This water preferably contains some acid, preferably sulfuric acid, to prevent hydrolysis of iron salts. In order to prevent undesirably high accumulation of ferrous sulfate solution in the system, part of the aqueous phase withdrawn from settler 17 through conduit 18 is withdrawn from the system through outlet 22. The substantially peroxide-free organic phase separated in settler 17 is passed through conduit 23 to fractionator 24, which, in practice will usually to a series of two separate fractionating colums. In fractionator 24 the following fractions are separated: a relatively low-boiling fraction comprising mainly unreacted cyclopentane, which is recycled through conduit 25 to reactor 4; an intermediate fraction comprising mainly cyclopentanone, which is withdrawn, as the main product of the process, through outlet 26; and a relatively high-boiling kettle product comprising cyclopentanol, which is withdrawn through outlet 27. The last-named fraction may be converted to cyclopentanone by dehydrogenation in means not shown in the drawing.

Example I

In each of three runs, cyclopentane was oxidized by air in a reactor similar to that previously described. The total oxidation product was allowed to stand until the aqueous phase had separated from the organic phase. Unreacted cyclopentane was separated from the organic phase by fractionation. The cyclopentane-free product was then treated with saturated aqueous ferrous sulfate containing sufficient sulfuric acid to prevent hydrolysis of iron salts. The peroxide content of the treated and the untreated organic phase was determined by titration of samples with standard ceric sulfate solution. The following data were obtained:

| Run | Peroxides in Product, Calculated as $H_2O_2$, wt. Per Cent | | Cyclopentanone in Product, gm. | |
|---|---|---|---|---|
| | Before $FeSO_4$ Treatment | After $FeSO_4$ Treatment | Before $FeSO_4$ Treatment | After $FeSO_4$ Treatment |
| 1 | 2.93 | 0.03 | | |
| 2 | 2.89 | 0.03 | | |
| 3 | 3.32 | 0.03 | 53 | 57 |

It is noteworthy that, in Run 3, the ferrous sulfate treatment effected simultaneously a 99 per cent removal of peroxides and an 8 per cent increase in the yield of cyclopentanone.

Example II

In two runs similar to those described in Example I, methylcyclopentane was oxidized with air to methylcyclopentanone. The product was freed from unreacted methylcyclopentane by fractional distillation. The methylcyclopentane-free product was treated with ferrous sulfate solution as previously described. The following data were obtained:

| Run | Peroxides in Product, Calculated as $H_2O_2$, wt. Per Cent | |
|---|---|---|
| | Before $FeSO_4$ Treatment | After $FeSO_4$ Treatment |
| 4 | 5.8 | 0.02 |
| 5 | 10 | 0.26 |

It may be noted that, although the results in Examples I and II were obtained by simple batch treatments with ferrous sulfate, the lowest peroxide removal was 96 per cent (Run 4).

I claim:

1. A process for the production of cyclic ketones substantially free from organic peroxide impurities which comprises oxidizing a cycloparaffin with oxygen in the presence of an oxidation catalyst; separating from the products of reaction an organic phase comprising cyclic ketones, cyclic alcohols, unreacted cycloparaffin, and organic acids and peroxides as impurities; washing said organic phase with alkali to neutralize said acids; contacting the washed product with an aqueous ferrous sulfate solution containing sufficient sulfuric acid to prevent hydrolysis of said ferrous sulfate; separating the resulting mixture into an organic phase and an aqueous phase containing ferric sulfate; recovering from the thus separated organic phase cyclic alcohols, unreacted cycloparaffin and cyclic ketones resulting from said oxidation of a cycloparaffin and from said reaction with ferrous sulfate; recycling said recovered cycloparaffin to said oxidation step; contacting at least a portion of said aqueous phase containing ferric sulfate with finely divided iron to regenerate ferrous sulfate from said ferric sulfate; and introducing said regenerated ferrous sulfate, water and sulfuric acid to said step wherein the alkali washed-organic phase is contacted with an aqueous ferrous sulfate solution.

2. A process according to claim 1 wherein the aqueous solution of ferrous sulfate is acidified to a pH in the range of 1 to 2.5.

3. A process according to claim 1 wherein the aqueous ferrous salt solution is acidified to a pH below 3.

4. A process according to claim 1 wherein the oxidation reaction mixture is contacted with a ferrous salt at a temperature of 0 to 30° C. and at atmospheric pressure.

5. A process according to claim 1 wherein the the cycloparaffin is cyclopentane and cyclopentanone is produced as a product of the process.

6. A process according to claim 1 wherein the cycloparaffin is methylcyclopentane and methylcyclopentanone is produced as a product of the process.

HAROLD WILLIAM FLEMING.

REFERENCES CITED

The following references are of record in the file of this patent:

UNITED STATES PATENTS

| Number | Name | Date |
|---|---|---|
| 2,115,781 | Morrell | May 3, 1938 |
| 2,223,494 | Loder | Dec. 3, 1940 |
| 2,223,500 | Scott | Dec. 3, 1940 |
| 2,279,277 | Shoemaker | Apr. 7, 1942 |
| 2,302,468 | Palmer et al. | Nov. 17, 1942 |
| 2,349,211 | Tulleners | May 16, 1944 |
| 2,369,181 | Rust | Feb. 13, 1945 |

OTHER REFERENCES

Hock: Ber. 72B, 1562–8 (1939).

Hock et al.: Berichte, vol. 75, pages 1051–1054, (1942); vol. 76, pages 1130–1131, (1943); vol. 76, pages 169–172 (1943).